United States Patent
Ogawa

(10) Patent No.: US 8,334,802 B2
(45) Date of Patent: Dec. 18, 2012

(54) RADAR SYSTEM

(75) Inventor: Masaru Ogawa, Seto (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 445 days.

(21) Appl. No.: 12/573,383

(22) Filed: Oct. 5, 2009

(65) Prior Publication Data

US 2010/0103023 A1   Apr. 29, 2010

(30) Foreign Application Priority Data

Oct. 28, 2008  (JP) .................................. 2008-276867

(51) Int. Cl.
    *G01S 13/60*   (2006.01)
    *G01S 13/93*   (2006.01)
    *G01S 13/00*   (2006.01)

(52) U.S. Cl. ............ 342/129; 342/27; 342/70; 342/118; 342/128; 342/175; 342/195

(58) Field of Classification Search .............. 342/27, 342/28, 59, 70–72, 118, 128–133, 175, 192–197, 342/89–103; 701/300, 301
See application file for complete search history.

(56) References Cited

U.S. PATENT DOCUMENTS

| | | | | |
|---|---|---|---|---|
| 4,151,526 A | * | 4/1979 | Hinachi et al. ................ | 342/59 |
| 4,347,513 A | * | 8/1982 | Schindler .................... | 342/59 |
| 4,818,999 A | * | 4/1989 | Kobayashi et al. ............ | 342/59 |
| 5,045,856 A | * | 9/1991 | Paoletti ...................... | 342/70 |
| 6,028,548 A | * | 2/2000 | Farmer ....................... | 342/70 |
| 6,064,331 A | * | 5/2000 | Avila et al. ................... | 342/59 |
| 6,246,359 B1 | * | 6/2001 | Asano et al. ................. | 342/128 |
| 6,362,774 B1 | * | 3/2002 | Green ......................... | 342/59 |
| 6,680,688 B1 | * | 1/2004 | Jiang et al. .................. | 342/195 |
| 6,727,844 B1 | * | 4/2004 | Zimmermann et al. ........ | 342/70 |
| 6,762,711 B1 | * | 7/2004 | Doerfler ...................... | 342/70 |
| 6,873,251 B2 | * | 3/2005 | Schiffmann et al. ........... | 342/59 |
| 6,992,613 B2 | * | 1/2006 | Yoneda ....................... | 342/59 |
| 7,095,361 B2 | * | 8/2006 | Mattes et al. ................. | 342/70 |
| 7,248,153 B2 | * | 7/2007 | Danz et al. ................... | 342/27 |
| 7,414,569 B2 | * | 8/2008 | De Mersseman ............. | 342/59 |

(Continued)

FOREIGN PATENT DOCUMENTS

EP   1 840 595 A2   10/2007

(Continued)

OTHER PUBLICATIONS

Office Action issued Aug. 31, 2010 in JP Application No. 2008-276867 (With English Translation).

(Continued)

*Primary Examiner* — Bernarr Gregory
(74) *Attorney, Agent, or Firm* — Oblon, Spivak, McClelland, Maier & Neustadt, L.L.P.

(57) ABSTRACT

A radar system includes radars and a controller. The controller controls waveform patterns of the radars. As a signal processing unit of each of the radars receives an instruction from the controller, the signal processing unit selects a frequency modulation pattern of a VCO between an FM-CW mode and a CW mode stored in a waveform memory to perform mode switching, and then outputs a radio wave from a transmission antenna. Then, the controller instructs each signal processing unit for a frequency modulation pattern of each radar or an output timing of each pattern so that a time, at which continuous wave signals output from the radars have the same frequency, is not continuous.

11 Claims, 6 Drawing Sheets

U.S. PATENT DOCUMENTS

| | | | |
|---|---|---|---|
| 7,504,988 B2 * | 3/2009 | Tsuchihashi et al. | 342/70 |
| 7,518,545 B2 * | 4/2009 | Minichshofer | 342/70 |
| 7,522,092 B2 * | 4/2009 | Okai et al. | 342/70 |
| 7,554,484 B2 * | 6/2009 | Zimmermann et al. | 342/70 |
| 7,592,945 B2 * | 9/2009 | Colburn et al. | 342/70 |
| 7,889,116 B2 * | 2/2011 | Harada et al. | 342/59 |

FOREIGN PATENT DOCUMENTS

| | | |
|---|---|---|
| JP | 8-105963 | 4/1996 |
| JP | 10-48329 | 2/1998 |
| JP | 2000-206234 | 7/2000 |
| JP | 2000-292530 | 10/2000 |
| JP | 2002-14159 | 1/2002 |
| JP | 2004-69693 | 3/2004 |
| JP | 2006-220624 | 8/2006 |
| JP | 2006-242818 | 9/2006 |
| JP | 2007-155551 | 6/2007 |
| JP | 2007-187632 | 7/2007 |
| JP | 2007-232498 | 9/2007 |
| JP | 2007-263915 | 10/2007 |
| JP | 2008-145425 | 6/2008 |
| JP | 2008-298736 | 12/2008 |

OTHER PUBLICATIONS

Office Action issued Mar. 22, 2012, in German Patent Application No. 10 2009 046 000.4 (with English-language translation).

* cited by examiner

RADAR SYSTEM

INCORPORATION BY REFERENCE

The disclosure of Japanese Patent Application No. 2008-276867 filed on Oct. 28, 2008 including the specification, drawings and abstract is incorporated herein by reference in its entirety.

BACKGROUND OF THE INVENTION

1. Field of the Invention

The invention relates to a technique for preventing radio wave interference between a plurality of radars.

2. Description of the Related Art

A vehicle (mobile unit) equipped with a radar at the front or rear thereof is practically used. The radar is able to detect an obstacle, and acquires a distance to the obstacle and a relative velocity of the obstacle. With the above configuration, the vehicle is able to avoid a collision with the obstacle or warn a driver of the collision. A known waveform of a radio wave output from such a radar, for example, includes an FM-CW mode of a frequency modulation pattern in which the frequency is increased or decreased along a triangular wave and a CW mode in which a plurality of (for example, two) frequencies are switched in a time-sharing manner (see Japanese Patent Application Publication No. 2007-187632 (JP-A-2007-187632), Japanese Patent Application Publication No. 2002-14159 (JP-A-2002-14159), Japanese Patent Application Publication No. 2004-69693 (JP-A-2004-69693), Japanese Patent Application Publication No. 2006-242818 (JP-A-2006-242818) and Japanese Patent Application Publication No. 2007-155551 (JP-A-2007-155551)). It is generally known that a radar system, when using a CW mode, is not able to detect a vehicle (an example of an obstacle) when a relative velocity with respect to the vehicle is zero. In the existing art, one radar is switched between the CW mode and the FM-CW mode (JP-A-2004-69693).

In addition, such a radar has a problem in radio wave interference with another vehicle, or the like (see JP-A-2007-187632, JP-A-2002-14159, JP-A-2004-69693, JP-A-2006-242818 and JP-A-2007-155551). JP-A-2007-187632 and JP-A-2007-155551 describe that a radar outputs a radio wave in a time-sharing manner or in a time period during which a radar of another vehicle is not outputting a radio wave. JP-A-2002-14159 describes that an FM-CW transmission wave spectrally diffused in a random coding sequence is transmitted, a correlation process is performed at a reception side, and, when a coding sequence differs from the transmitted coding sequence, radio wave interference is prevented. JP-A-2006-242818 describes that, when spike noise is output because of radio wave interference, an average value of values adjacent to the spike noise is output.

However, when one and the same mobile unit is equipped with a plurality of radars, there is a possibility that a radio wave transmitted from one radar (for example, a radar provided at the right front of a vehicle) interferes with a radio wave transmitted from another radar (for example, a radar provided at the left front of the vehicle). In order to prevent such interference, when a technique for preventing the interference of radio waves of radars in a time-sharing manner as described in JP-A-2007-187632 or JP-A-2007-155551 is applied, a radar does not transmit a radio wave while another radar is transmitting a radio wave. This elongates a time interval for detection, and there is a possibility that detection of an obstacle delays.

SUMMARY OF THE INVENTION

The invention provides a radar system that effectively prevents radio wave interference between a plurality of radars.

(1) A first aspect of the invention relates to a radar system that detects a surrounding obstacle using at least two radars. The radar system includes: a first radar that transmits an electromagnetic wave in accordance with one or more frequency modulation patterns; a second radar that transmits an electromagnetic wave in accordance with one or more frequency modulation patterns; and a controller that controls the first radar and the second radar. The controller controls the first radar and the second radar so that a time, at which the electromagnetic waves output respectively from the first radar and the second radar at the same time have the same frequency, is not continuous.

With the above configuration, the controller controls the first radar and the second radar so that a time, at which the electromagnetic waves output respectively from the first radar and the second radar at the same time have the same frequency, is not continuous (that is, there is no chance that the respective electromagnetic waves become the same frequency or the respective electromagnetic waves temporarily become the same frequency). Thus, it is possible to minimize interference even when the ranges of detection of the first radar and second radar overlap each other.

(2) The controller may differentiate the frequency modulation pattern used in the first radar from the frequency modulation pattern used in the second radar.

With the above configuration, the frequency modulation pattern used in the first radar differs from the frequency modulation pattern used in the second radar, so it is possible to suppress interference.

(3) The first radar and the second radar each may transmit an electromagnetic wave by alternately switching between a first frequency modulation pattern and a second frequency modulation pattern that is different from the first frequency modulation pattern. The controller may control the first radar and the second radar so that, while one of the first radar and the second radar is transmitting an electromagnetic wave in accordance with the first frequency modulation pattern, the other one of the first radar and the second radar may transmit an electromagnetic wave in accordance with the second frequency modulation pattern.

With the above configuration, even when the first frequency modulation pattern and the second frequency modulation pattern are alternately switched in each radar, while one of the radars is transmitting an electromagnetic wave in accordance with the first frequency modulation pattern, the other radar transmits an electromagnetic wave in accordance with the second frequency modulation pattern. Thus, it is possible to suppress interference.

(4) The first frequency modulation pattern may be a CW mode, and the second frequency modulation pattern may be an FM-CW mode.

With the above configuration, one of the frequency modulation patterns used in the first radar and the second radar is set to an FM-CW mode, and the other frequency modulation pattern is set to a CW mode. Thus, it is possible to suppress interference. In addition, by alternately switching between the FM-CW mode and the CW mode in each radar, it is possible to detect a distance to an obstacle and a relative velocity of the obstacle.

(5) The first frequency modulation pattern and the second frequency modulation pattern may be set so that a transmission frequency of the CW mode is not included in a transmission frequency band of the FM-CW mode.

With the above configuration, frequencies of electromagnetic waves that are respectively output from the first radar and the second radar at the same time do not coincide with each other. Thus, it is possible to suppress interference.

(6) The first frequency modulation pattern and the second frequency modulation pattern may be set so that a transmission frequency of the CW mode coincides with an upper limit or lower limit of a frequency band of the FM-CW mode.

With the above configuration, a time, at which the electromagnetic waves output respectively from the first radar and the second radar at the same time have the same frequency, is not continuous. Thus, it is possible to minimize interference. In addition, with the above configuration, it is possible to narrow a necessary frequency band as compared with the configuration described in the above (5). In addition, when a usable frequency band is limited, it is possible to ensure a wide frequency band usable in the FM-CW mode within the limited frequency band. When the frequency band of the FM-CW mode may be widened, it is possible to increase the resolution of a distance of the radar system.

Note that adverse influence due to interference (adverse influence on accuracy of detecting an obstacle) is relatively small at a transmission start timing and transmission end timing of an electromagnetic wave. Thus, in the above configuration, when a timing, at which a frequency of an electromagnetic wave output from the first radar coincides with a frequency of an electromagnetic wave output from the second radar, coincides with a transmission start timing or transmission end timing of an electromagnetic wave of each radar, it is desirably possible to reduce adverse influence due to interference.

(7) The first frequency modulation pattern may be a dual-frequency CW mode that alternately uses two transmission frequencies, and the controller may cause a timing, at which a transmission frequency of the CW mode that is the first frequency modulation pattern coincides with a transmission frequency of the FM-CW mode that is the second frequency modulation pattern, to coincide with a timing at which a transmission frequency of the dual-frequency CW mode is switched.

Adverse influence due to interference (adverse influence on accuracy of detecting an obstacle) is relatively small at a timing at which a transmission frequency of a dual-frequency CW mode is switched. Thus, with the above configuration, a timing, at which a frequency of an electromagnetic wave output from the first radar coincides with a frequency of an electromagnetic wave output from the second radar, coincides with a timing at which a transmission frequency of a dual-frequency CW mode. Thus, it is possible to reduce adverse influence due to interference is switched.

(8) The first frequency modulation pattern and the second frequency modulation pattern may be set so that a transmission frequency of the CW mode does not coincide with a transmission frequency of the FM-CW mode in such a manner that a continuous transmission time of an electromagnetic wave in the CW mode is shorter than a continuous transmission time of an electromagnetic wave in the FM-CW mode.

With the above configuration, a similar advantageous effect to the configuration of the above (6) may be obtained. In addition, a continuous transmission time of an electromagnetic wave in the CW mode is set so as to be shorter than a continuous transmission time of an electromagnetic wave in the FM-CW mode so that a transmission frequency of the CW mode does not coincide with a transmission frequency of the FM-CW mode. Thus, it is possible to suppress interference.

(9) A frequency modulation pattern used in the first radar and a frequency modulation pattern used in the second radar may be the same frequency modulation pattern, and the controller may differentiate mutual phases of electromagnetic waves transmitted respectively from the first radar and the second radar in accordance with the same frequency modulation pattern.

With the above configuration, the frequency modulation pattern used in the first radar differs in phase from the frequency modulation pattern used in the second radar, so it is possible to suppress interference.

(10) The same frequency modulation pattern may be an FM-CW mode.

With the above configuration, it is possible to detect a relative velocity of an obstacle by each radar, and a time, at which frequencies of electromagnetic waves transmitted from the radars become the same frequency, may be made discontinuous. Thus, it is possible to suppress interference.

(11) The controller may control the first radar and the second radar so that, while a frequency of an electromagnetic wave transmitted from one of the first radar and the second radar is monotonously increasing, a frequency of an electromagnetic wave transmitted from the other one of the first radar and the second radar monotonously decreases.

With the above configuration, a time, at which frequencies of electromagnetic waves transmitted from the radars become the same frequency, may be made discontinuous. Thus, it is possible to suppress interference.

A second aspect of the invention relates to a method of controlling a radar system that detects a surrounding obstacle. The method includes: transmitting a first electromagnetic wave in accordance with one or more frequency modulation patterns; transmitting a second electromagnetic wave in accordance with one or more frequency modulation patterns; and controlling the first and second electromagnetic waves so that a time, at which frequencies of the first and second electromagnetic waves become the same frequency, is not continuous.

According to the aspects of the invention, it is possible to suppress radio wave interference between a plurality of radars.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, a radar system according to a first embodiment of the invention will be described with reference to the accompanying drawings.

Figure 1A:
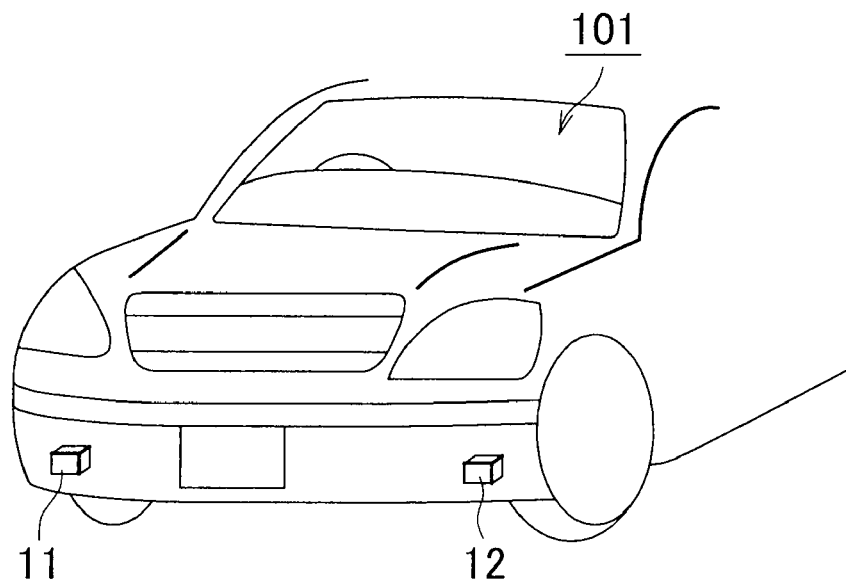
FIG. 1A and FIG. 1B are external views of radars according to an embodiment of the invention.
Figure 1B:
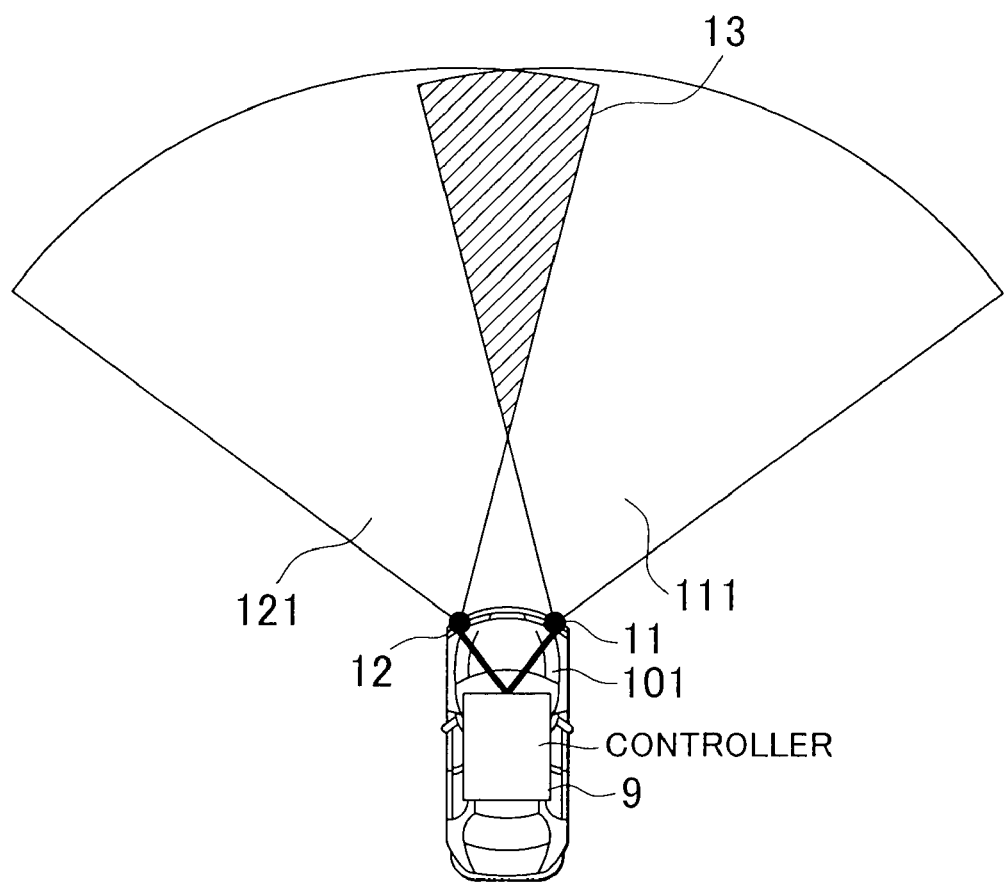

FIG. 1A and FIG. 1B are external views of radars according to the first embodiment of the invention. FIG. 1A shows arrangement of the radars as viewed from the front of a vehicle 101. FIG. 1B shows ranges 111 and 112 of detection of the radars 11 and 12 as viewed from the upper side of the vehicle 101.

Figure 2:
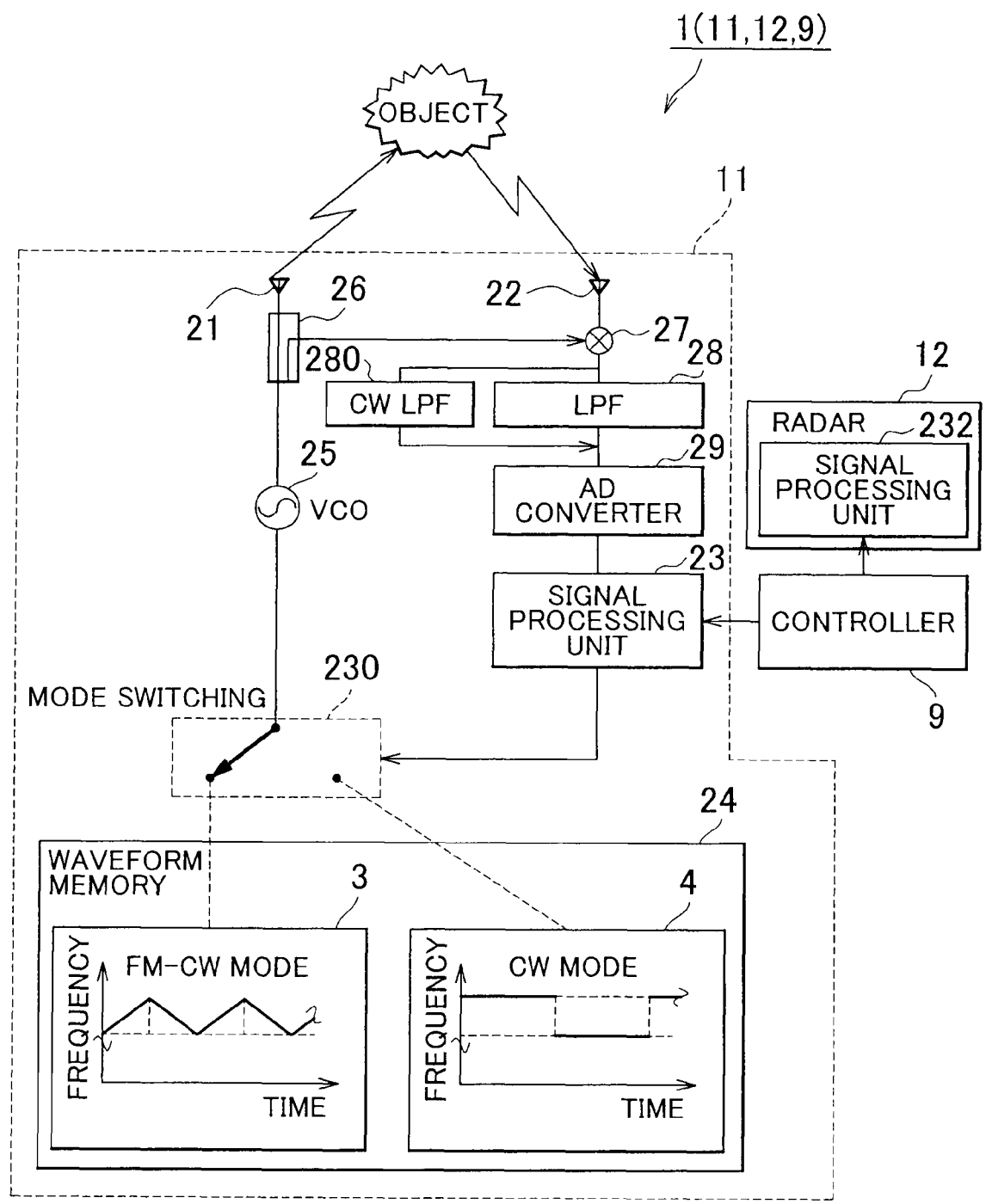
FIG. 2 is a configuration diagram of a radar system according to the embodiment of the invention.

As shown in FIG. 1A, the vehicle 101 is equipped with a radar system (which corresponds to a radar system 1 shown in FIG. 2). The radar system includes the plurality of radars 11 and 12 (in this application, when simply referred to a radar, it indicates not the whole radar system but the radar equipped for the radar system). The radar 11 and the radar 12 each output a distance to an object ahead and a relative velocity of the object to an external component. The radars 11 and 12 are, for example, provided at both ends of the front of the vehicle 101. A plurality of the radars 11 and 12 are provided, so a range of detection may be widened.

As shown in FIG. 1B, the radar system 1 includes a controller 9 inside the vehicle 101. The controller 9 integrally controls the radars 11 and 12. The ranges 111 and 112 of detection of the radars 11 and 12 overlap each other. (see an overlapped range 13). Thus, radio waves transmitted respectively from transmission antennas of the radars 11 and 12 to the overlapped range 13 may possibly be received by reception antennas of the opposite radars 11 and 12. Then, the controller 9 controls the frequency, phase, and the like, of each of the radars 11 and 12 so as not to cause interference between the radar 11 and the radar 12.

FIG. 2 is a configuration diagram of the radar system according to the first embodiment of the invention. As shown in FIG. 2, the radar system 1 includes the radars 11 and 12 and the controller 9. The radar 11 and the radar 12 may have the same configuration. In the following description regarding the radar 12, like reference numerals to those of the radar 11 will be referred to.

The radar 11 includes a transmission antenna 21, a reception antenna 22, a signal processing unit 23, a waveform memory 24, a voltage controlled oscillator (VCO) 25, a directional coupler 26, a mixer 27, a low-pass filter (LPF) 28, a continuous wave (CW) LPF 280, and an AD converter 29.

The transmission antenna 21 and the reception antenna 22 are located on a surface of the vehicle 101 shown in FIG. 1A. The transmission antenna 21 transmits a radio wave to the outside. The reception antenna 22 receives the radio wave that is reflected from an object.

The signal processing unit 23 generates a driving signal input to the VCO 25 (hereinafter, when simply referred to a driving signal, it indicates a signal input to the VCO 25). The waveform memory 24 stores signals of waveforms (frequency modulation patterns) of an FM-CW mode 3 and CW mode 4. The signal processing unit 23 selects the mode 3 or 4 read out from the waveform memory 24, and outputs a triangular or rectangular driving signal to the VCO 25 via a DA converter (not shown).

The VCO 25 controls an oscillation frequency by a driving voltage applied to the VCO 25. That is, the frequency output from the VCO 25 may be changed by the driving voltage. As the voltage waveform of any one of the FM-CW mode 3 and the CW mode 4 is input to the VCO 25, the VCO 25 generates a continuous wave signal. The transmission antenna 21 uses the continuous wave signal to output an electromagnetic wave. For example, as the triangular wave of the FM-CW mode 3 is input to the VCO 25, the VCO 25 outputs a modulated wave signal such that the frequency increases or decreases over time. The ordinate axis in the FM-CW mode shown in FIG. 2 represents such variations in frequency. In addition, as the rectangular wave of the CW mode 4 is input to the VCO 25, the VCO 25 outputs a signal such that the frequency is switched to any one of a plurality of frequencies in a time-sharing manner. The ordinate axis in the CW mode 4 shown in FIG. 2 represents such two frequencies to be switched.

Note that FIG. 2 shows a two-frequency CW mode in which two transmission frequencies are alternately switched and used; however, the aspect of the invention is not limited to this configuration. The CW mode may be such that the transmission frequency is always constant, or the CW mode may be such that three or more transmission frequencies are sequentially switched and used.

The signal processing unit 23 switches between the waveforms of the FM-CW mode 3 and CW mode 4 input from the waveform memory 24 in accordance with an instruction of the controller 9. By so doing, the signal processing unit 23 performs mode switching 230 between the FM-CW mode 3 and the CW mode 4.

The directional coupler 26 is inserted in a transmission line between the VCO 25 and the transmission antenna 21. The directional coupler 26 outputs part of electric power, transmitted through the transmission line, to the mixer 27.

As described above, a radio wave reflected by an object is received by the reception antenna 22. In addition, the mixer 27 synthesizes a differential signal (beat signal) between a transmission wave signal output from the transmission antenna 21 and a reception wave signal received by the reception antenna 22. The low-pass filter (LPF) 28 removes noise from the beat signal, and extracts only a necessary band so as to increase the accuracy of AD conversion. The CW LPF 280 is a filter that is used when a radio wave is output in the FM-CW mode 3. The CW LPF 280 is not always necessary. However, the CW mode 4 requires only a plurality of frequency bands and has a narrow band, so the CW LPF 280 is desirably provided.

The AD converter 29 converts an analog beat signal, input from the LPF 28 and the CW LPF 280, into a digital beat signal.

The signal processing unit 23 not only generates the above driving signal but also performs Fourier transform on the beat signal converted by the AD converter 29. The signal processing unit 23 generates a gain and a phase through Fourier transform. The signal processing unit 23 outputs a velocity and relative distance of the object to the controller 9 based on this gain and this phase by a known method described in JP-A-2007-187632, JP-A-2002-14159, JP-A-2004-69693, JP-A-2006-242818, JP-A-2007-155551, or the like. Note that a window function may be convolved when the signal processing unit 23 performs Fourier transform.

The controller 9 determines which mode (the FM-CW mode 3 or the CW mode 4) is output from the radars 11 and 12 at what timing, and the period and frequency of the mode, and then instructs the radars 11 and 12. Where necessary, a plurality of the pieces of waveform data may be provided in the waveform memory 24 for each of the FM-CW mode 3 and CW mode 4 or the waveform data of each of the FM-CW mode 3 and CW mode 4 in the waveform memory 24 may be parameterized. By so doing, the signal processing unit 23 of each of the radars 11 and 12 generates a necessary driving signal in correspondence with such an instruction from the controller 9. Transmission of the instruction may be, for example, performed so that the controller 9 sets a parameter in the signal processing unit 23. By so doing, the frequency of a radio wave output from each of the radars 11 and 12 is controlled by the controller 9.

Next, first to tenth embodiments of frequency modulation patterns of radio waves used in the radar system according to the embodiment of the invention will be described with reference to FIG. 3A to FIG. 6. In all the following embodiments, a time at which the frequencies of continuous wave signals coincide with each other is not continuous. Waveforms 31 to 40 shown in FIG. 3A to FIG. 6 respectively indicate changes in frequency used in the radar 11 over time. Waveforms 41 to 50 shown in FIG. 3A to FIG. 6 respectively indicate changes in frequency used in the radar 12 over time. The changes over time actually correspond to changes over time in voltage of a driving signal applied from the signal processing unit 23 to the VCO 25.

Figure 3A:
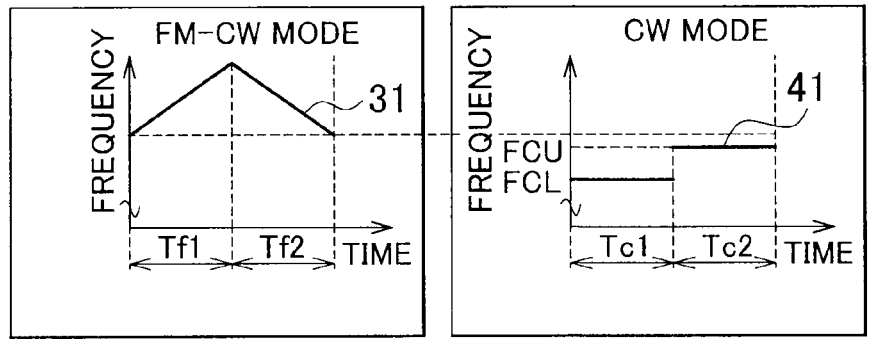
FIG. 3A to FIG. 3D are embodiments of frequency modulation patterns of radio waves used in the radars of the radar system according to the embodiment of the invention.

FIG. 3A shows the first embodiment of the frequency modulation patterns of radio waves. As the radio waves output from the transmission antennas by the radars 11 and 12 have the same frequency, radio wave interference occurs in the overlapped range 13. Then, as shown by the waveforms 31 and 41 according to the first embodiment, in order to minimize such radio wave interference, the radar 11 and the radar 12 respectively use the FM-CW mode 3 and the CW mode 4 to differentiate frequency bands from each other (a frequency band between FFL and FFH of the FM-CW mode 3>a frequency band between FCU and FCL of the CW mode 4). By so doing, the radar system 1 is able to prevent interference between the radars 11 and 12. Here, depending on the physical restrictions and restrictions by laws on a frequency band that the VCO 25 may output, the band of frequencies output from the VCO 25 may possibly be limited. In this case as well, a frequency band necessary for the CW mode 4 is just about a tenth of that of the FM-CW mode 3, so it is not necessary to widely ensure the frequency band for the CW mode 4.

Note that in the first embodiment, both the radars 11 and 12 may use the FM-CW mode 3 or both the radars 11 and 12 may use the CW mode 4 to separate bands. In FIG. 3A, the frequency band of the radar 11 is illustrated above the frequency band of the radar 12; however, in the first embodiment, it is only necessary that the bands are separated, and any one of the radars 11 and 12 may have a higher frequency band. In addition, in the first embodiment, a time period Tf1 from a minimum frequency FFL to a maximum frequency FFH and a time period Tf2 from the maximum frequency FFH to the minimum frequency FFL in the FM-CW mode 3 and time periods Tc1 and Tc2 of the frequencies in the CW mode 4 according to the first embodiment all may be different from one another (this also applies to the second and third embodiments). In addition, when the FM-CW mode 3 is used, the resolution of a distance improves as the frequency band is wider. Thus, the frequency band of the FM-CW mode 3 is set to be higher than the frequency band of the CW mode 4 to improve the resolution of a distance.

Figure 3B:
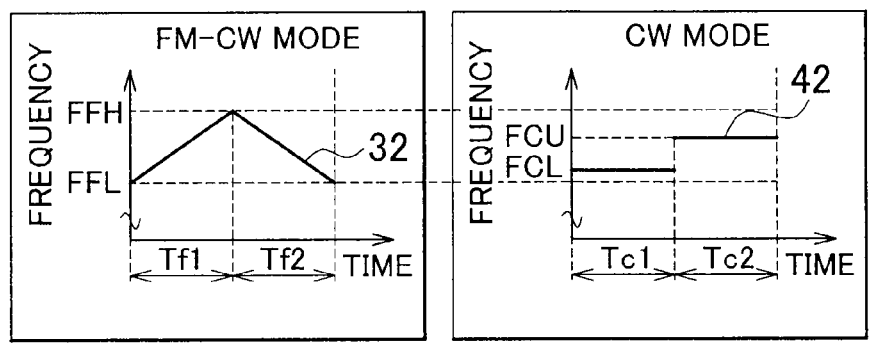

FIG. 3B shows the second embodiment of the frequency modulation patterns of radio waves. As shown by the waveforms 32 and 42, in the second embodiment, the controller 9 adjusts these frequency bands so that the frequency band (FCU to FCL) of the radar 12 is included in the frequency band (FFL to FFH) of the radar 11. With the second embodiment, the frequency bands used by the radar 11 and the radar 12 are not completely separated; however, a time, at which the frequencies of continuous wave signals output from the respective VCOs 25 have the mutually same frequency between the radars, may be made discontinuous. Thus, with the second embodiment, the radar system 1 is able to minimize interference. In addition, the radar system 1 is able to suppress an increase in frequency band of a radio wave.

Figure 3C:
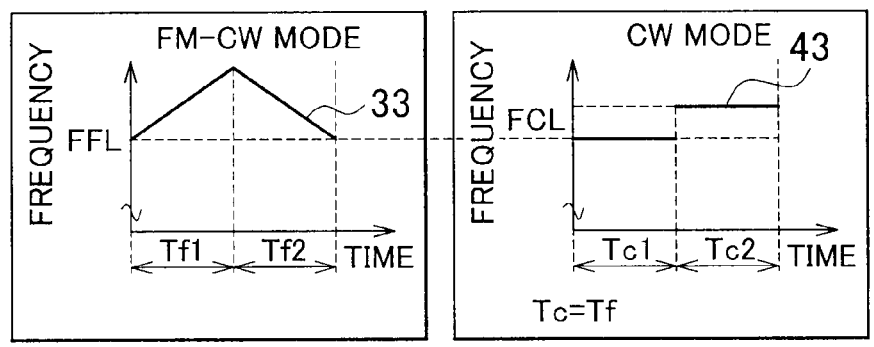

FIG. 3C shows the third embodiment of the frequency modulation patterns of radio waves. In the third embodiment, the controller 9 causes the minimum frequency FFL of the FM-CW mode 3 used in the radar 11 to coincide with the minimum frequency FCL of the CW mode 4 used in the radar 12. Between the minimum frequencies, the frequencies instantaneously coincide with each other; however, when the window function is convolved at the time of Fourier transform, there is less influence of interference at the minimum frequency and maximum frequency of the FM-CW mode 3. Then, in this way, any one of the frequencies of the CW mode 4 desirably coincides with the frequency (the maximum frequency or the minimum frequency) at the peak or bottom of the FM-CW mode 3.

Note that it is also applicable that the maximum frequency FFH of the FM-CW mode 3 used in the radar 11 coincides with the maximum frequency of the CW mode 4 used in the radar 12. In this case as well, a similar advantageous effect to that of the third embodiment may be obtained. In addition, both the maximum frequency and minimum frequency of the FM-CW mode 3 used in the radar 11 may respectively coincide with both the maximum frequency and minimum frequency of the CW mode 4 used in the radar 12.

Figure 3D:
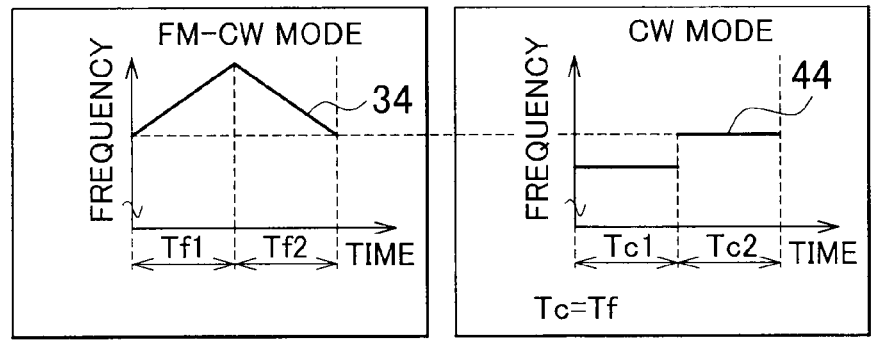

FIG. 3D shows the fourth embodiment of the frequency modulation patterns of radio waves. Because of the same reason as described in the third embodiment, the fourth embodiment differs from the first embodiment in that the controller 9 causes the minimum value of the frequency band of the FM-CW mode 3 used in the radar 11 to coincide with the maximum value of the frequency band of the CW mode 4 used in the radar 12. With the above configuration, it is possible to reduce the frequency band used by the radar system 1. In addition, when the FM-CW mode 3 is used, the resolution of a distance improves as the frequency band is wider. If the frequency band used in the fourth embodiment is the same as the frequency band used in the first embodiment, there is no portion that is not used in the frequency band in the fourth embodiment. Therefore, the frequency band of the FM-CW mode 3 of the forth embodiment may be widened within the available frequency band as compared with the first embodiment, so it is possible to increase the resolution of a distance.

Figure 4A:
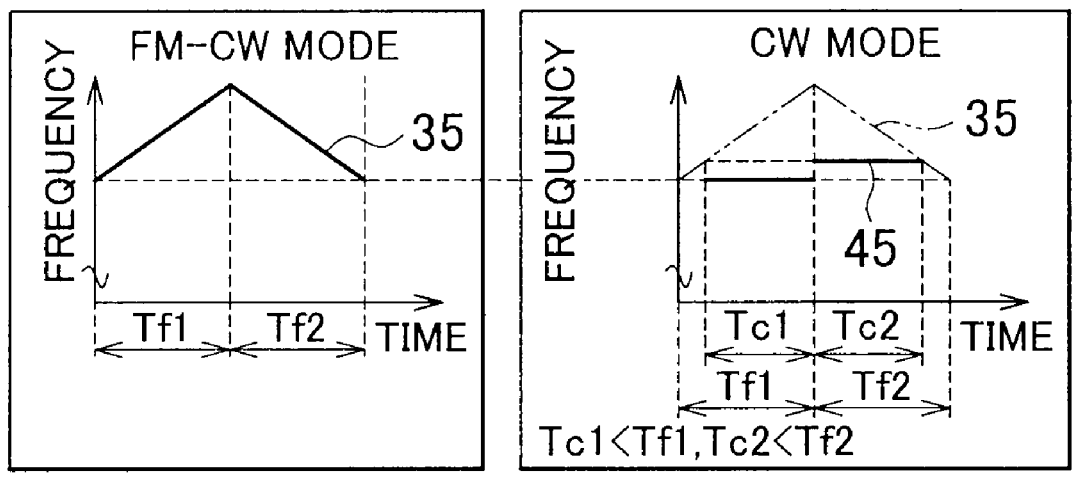
FIG. 4A and FIG. 4B are embodiments of frequency modulation patterns of radio waves used in the radars of the radar system according to the embodiment of the invention.

FIG. 4A shows the fifth embodiment of the frequency modulation patterns of radio waves. In this fifth embodiment, as shown by the waveforms 35 and 45, the controller 9 causes the period and phase of the FM-CW mode 3 to coincide with the period and phase of the CW mode 4. In addition, at the same time, the controller 9 causes the radar to intermittently output a radio wave in the CW mode 4, and the controller 9 sets a period (Tc1+Tc2), during which a radio wave is output in the CW mode 4, so as to be shorter than a period (Tf1+Tf2) of the FM-CW mode 3 (note that the period of the CW mode 4 in the fifth embodiment includes a time period during which no radio wave is output). By so doing, the frequency band of the CW mode 4 may be included in the triangle of the triangular wave of the FM-CW mode 3. Thus, the radar system 1 is able to configure the FM-CW mode 3 and the CW mode 4 so that there is no time at which the frequencies coincide with each other, and it is possible to reduce the width of the frequency band used in the radars 11 and 12.

Note that the fifth embodiment may be modified into an alternative embodiment such that the radar 11 intermittently outputs a radio wave in the FM-CW mode 3, and a period (Tf1+Tf2) during which a radio wave is output in the FM-CW mode 3 is set so as to be shorter than a period (Tc1+Tc2) during which a radio wave is output in the CW mode 4. In this case, the resolution of a distance decreases because the frequency band of the FM-CW mode 3 is limited, while this elongates a period of time during which a radio wave is output in the CW mode 4. Thus, it is possible to increase the resolution of a velocity of the radar 12. Here, in consideration of the resolution of a distance and the resolution of a velocity, it is desirable to preferentially use the one to increase the resolution of a distance. Thus, the fifth embodiment is more desirable than the alternative embodiment to the fifth embodiment.

Figure 4B:
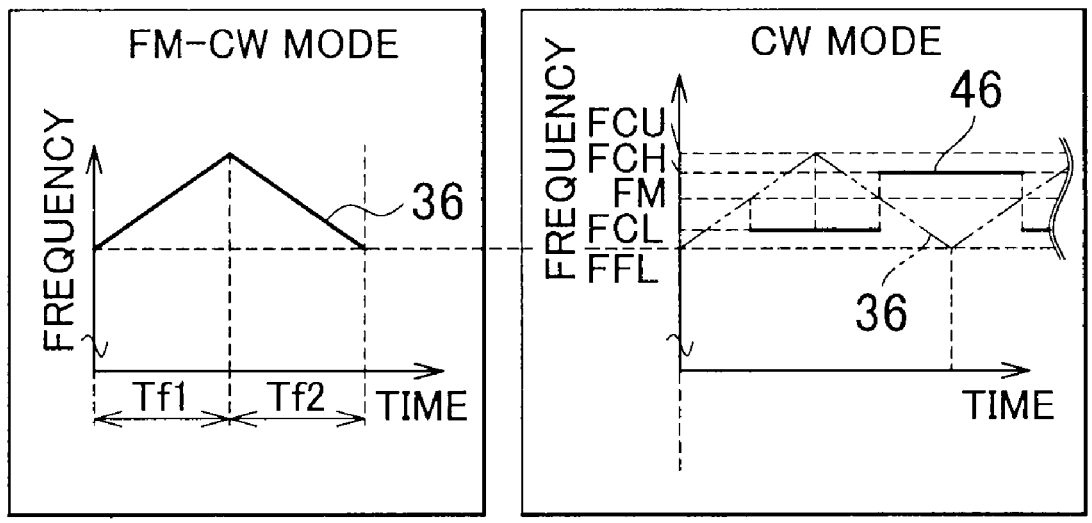

FIG. 4B shows the sixth embodiment of the frequency modulation patterns of radio waves. The radar 12 constantly transmits a radio wave. As shown by the waveforms 36 and 46, the controller 9 outputs radio waves in accordance with the following conditions.

In a time period during which the frequencies (FFL to FFU) output in the FM-CW mode 3 by the radar 11 are higher than a predetermined frequency FM in the middle of the frequencies, the radar 12 outputs a certain frequency FCL (between FFL and FM) that is lower than FM (this is the first condition).

In a time period during which the frequencies (FFL to FFU) output in the FM-CW mode 3 by the radar 11 are lower than the frequency FM, the radar 12 outputs a certain frequency FCH (between FM and FCH) that is higher than FM (this is the second condition).

With the above configuration, it is possible to configure the FM-CW mode 3 and the CW mode 4 so that there is no time at which the frequencies coincide with each other. That is, the radars 11 and 12 do not continuously transmit radio waves having the same frequency. In addition, it is possible to reduce the width of the frequency band used in the radars 11 and 12.

Note that the sixth embodiment describes a dual-frequency CW mode; however, as long as the first and second conditions described in the sixth embodiment are satisfied, the controller 9 may set three or more frequencies. In addition, similarly, when three or more radars (which correspond to 11 and 12) are used, the single FM-CW mode 3 and a plurality of the CW modes 4 may be used in combination.

Figure 5A:
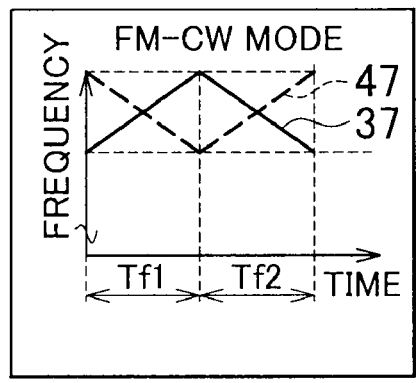
FIG. 5A to FIG. 5C are embodiments of frequency modulation patterns of radio waves used in the radars of the radar system according to the embodiment of the invention.

FIG. 5A shows the seventh embodiment of the frequency modulation patterns of radio waves. Both the radars 11 and 12 use the FM-CW mode 3. As shown by the waveform 37 and the waveform 47, the controller 9 causes the periods of the frequency modulation patterns of the radars 11 and 12 to coincide with each other and the phases to shift by 180 degrees from each other. In addition, the maximum frequencies and minimum frequencies of the respective FM-CW modes 3 coincide with each other. With the above configuration, the radars 11 and 12 do not continuously transmit radio waves having the same frequency, the radar system 1 is able to decrease the frequency of the radar 12 when the frequency of the radar 11 increases, and is able to increase the frequency of the radar 12 when the frequency of the radar 11 decreases. Thus, it is possible to suppress interference between the radars 11 and 12. In addition, it is possible to reduce the width of the frequency band used in the radars 11 and 12.

Figure 5B:
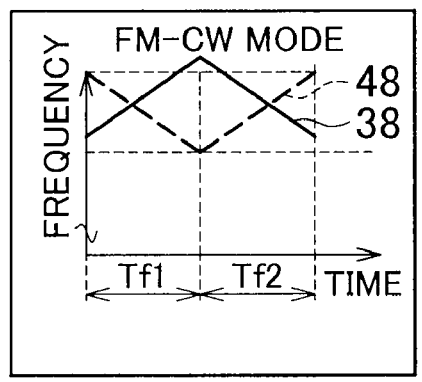

FIG. 5B shows the eighth embodiment of the frequency modulation patterns of radio waves. Both the radars 11 and 12 use the FM-CW mode 3. As shown by the waveform 38 and the waveform 48, the minimum frequency and maximum frequency of the waveform 38 are respectively higher than the minimum frequency and maximum frequency of the waveform 48, and the controller 9 causes the periods of the frequency modulation patterns to coincide with each other between the radars 11 and 12 and shifts the phases of the frequency modulation patterns by 180 degrees from each other. With the above configuration, the radars 11 and 12 do not continuously transmit radio waves having the same frequency.

Figure 5C:
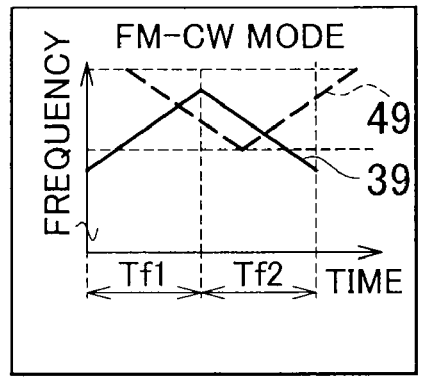

FIG. 5C shows the ninth embodiment of the frequency modulation patterns of radio waves. Both the radars 11 and 12 use the FM-CW mode 3. As shown by the waveform 39 and the waveform 49, the controller 9 causes the periods of the frequency modulation patterns to coincide with each other between the radars 11 and 12. With the above configuration, the radars 11 and 12 do not continuously transmit radio waves having the same frequency.

Figure 6:
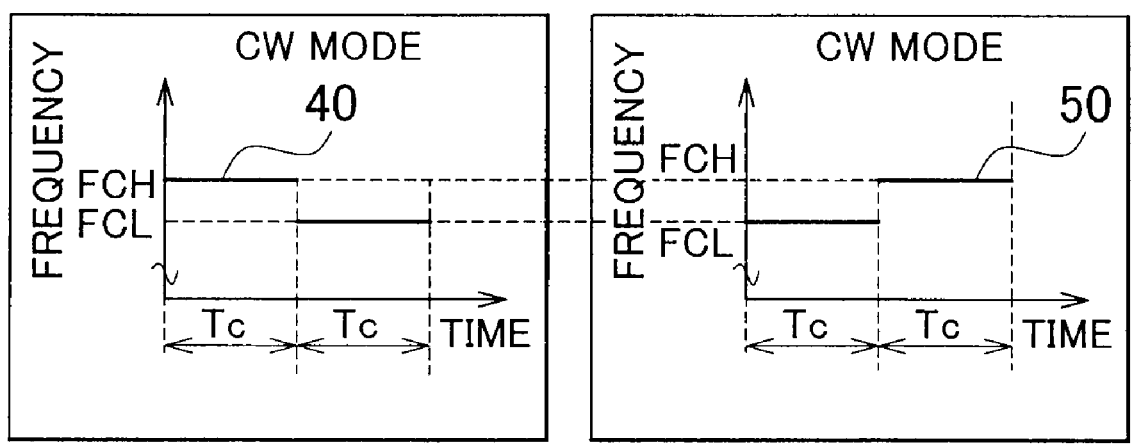
FIG. 6 is an embodiment of frequency modulation patterns of radio waves used in the radars of the radar system according to the embodiment of the invention.

FIG. 6 shows the tenth embodiment of the frequency modulation patterns of radio waves. Both the radars 11 and 12 use the CW mode 4. As shown by the waveform 40 and the waveform 50, the controller 9 causes the periods Tc of the frequency modulation patterns to coincide with each other between the radars 11 and 12 and shifts the phases of the frequency modulation patterns by 180 degrees from each other. That is, while one of the radars 11 and 12 is outputting a predetermined frequency (FCL or FCH), the controller 9 adjusts the other one of the radars 12 and 11 to output the other frequency (FCH or FCL), thus switching the frequencies used. With the above configuration, the radars 11 and 12 do not continuously transmit radio waves having the same frequency, and it is possible to reduce the width of the frequency band used in the radars 11 and 12.

Note that, when the radar system 1 alternately switches frequencies among three or more frequency bands by applying the tenth embodiment, it is possible to prevent interference from occurring among three or more radars.

Additional information to the above embodiment will be described below.

Note that the above description regarding FIG. 1A and FIG. 1B is made using blocks divided by functions; however, actually, any of a plurality of functions among these functions may be integrated, or one block may be divided into a plurality of blocks. For example, the controller 9 and the signal processing units 23 of a plurality of radars (which correspond to 11 and 12) may be integrated.

The radar system 1 illustrated in FIG. 2 is only illustrative. If the radar system 1 is able to modulate frequency by another means, it is not always necessary to use the VCO 25. It is also not always necessary that the radar system 1 controls frequency using driving voltage.

In the above first to tenth embodiments, the time periods Tf1, Tf2, Tc1 and Tc2, the frequencies FFL, FFH and FCH, and the like, are common to one another; however, those just illustrate the concept of the frequency bands, periods, and the like, of the FM-CW mode 3 and CW mode 4, and those are not necessarily set to the same value among the first to tenth embodiments.

In addition, in the above first to sixth embodiments, the radar 11 uses the FM-CW mode 3 and the radar 12 uses the CW mode 4. Instead, it is also applicable that the radar 12 uses the FM-CW mode 3 and the radar 11 uses the CW mode 4. In addition, the controller 9 may switch between the FM-CW mode 3 and the CW mode 4 used in the radars 11 and 12 at a predetermined period of time or a predetermined cycle. By so doing, each of the radars 11 and 12 is able to detect a distance to an obstacle and a relative velocity of the obstacle. In the above first to third embodiments, it is not necessary to set the periods of the modulation frequencies so as to coincide with each other between the radars 11 and 12. When the periods are switched as in this case, it is desirable that the radars 11 and 12 use the same period and phase of the output frequency pattern. When the periods are equal, it is not necessary to wait termination of the other one at the time when the periods are switched.

In addition, if one of the radars 11 and 12 uses a single mode, for example, only the FM-CW mode 3, it is only necessary that the waveform memory 24 stores only data of that mode (for example, FM-CW mode 3), and the mode switching 230 is not necessary.

In addition, the first to sixth embodiments may be easily extended to a configuration that includes the single FM-CW mode 3 and a plurality of the CW modes 4 having different transmission frequencies. In addition, in this extension, as described as application of the sixth embodiment, it is also applicable that the frequencies of radio waves are alternately switched among three or more frequency bands in a time-sharing manner. Furthermore, when the seventh to ninth embodiments are applied to a configuration having three or more radars (which correspond to radars 11 and 12), radio waves may be output at the same period so that the respective frequency bands do not coincide with one another or radio waves may be output in the same period with shifted phases in the same frequency band. With the above configuration, it is possible for a plurality of the radars not to continuously output the same frequency.

Furthermore, in the above description, radio waves are continuously output. However, when there is radio wave interference with another vehicle, frequencies may be adjusted or time may be shifted in order to prevent the radio wave interference. In addition, the radar system 1 may transmit an electromagnetic wave, such as light, instead of a radio wave.

Furthermore, in the present embodiment, the radar system 1 is mounted on the mobile unit, such as a vehicle; however, the radar system according to the aspect of the invention is not necessarily mounted on a mobile unit.

The aspect of the invention may be applied to a radar system that is equipped for a mobile unit, such as a vehicle.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A radar system comprising:
    a first radar that transmits a first radio wave in accordance with one or more frequency modulation patterns;
    a second radar that transmits a second radio wave in accordance with one or more frequency modulation patterns; and
    a controller that controls the first radar and the second radar to detect a surrounding obstacle so that the first radio wave and the second radio wave do not continuously have a same frequency, wherein
    the first radar and the second radar transmit the first radio wave and second radio wave, respectively, by alternately switching between a first frequency modulation pattern and a second frequency modulation pattern that is different from the first frequency modulation pattern, and
    the controller controls the first radar and the second radar so that, while one of the first radar and the second radar is transmitting in accordance with the first frequency modulation pattern, the other one of the first radar and the second radar transmits in accordance with the second frequency modulation pattern.

2. The radar system according to claim 1, wherein
    the first frequency modulation pattern is a continuous wave mode, and
    the second frequency modulation pattern is a frequency modulated continuous wave mode.

3. The radar system according to claim 2, wherein
    the first frequency modulation pattern and the second frequency modulation pattern are set so that a transmission frequency of the continuous wave mode is not included in a transmission frequency band of the frequency modulated continuous wave mode.

4. The radar system according to claim 2, wherein
    the first frequency modulation pattern and the second frequency modulation pattern are set so that a transmission frequency of the continuous wave mode coincides with an upper limit or a lower limit of a frequency band of the frequency modulated continuous wave mode.

5. The radar system according to claim 4, wherein
    the first frequency modulation pattern and the second frequency modulation pattern are set so that the transmission frequency of the continuous wave mode does not coincide with a transmission frequency of the frequency modulated continuous wave mode in such a manner that a continuous transmission time of a radio wave in the continuous wave mode is shorter than a continuous transmission time of a radio wave in the frequency modulated continuous wave mode.

6. The radar system according to claim 2, wherein
    the first frequency modulation pattern is a dual-frequency continuous wave mode that alternately uses two transmission frequencies, and
    the controller causes a timing, at which a transmission frequency of the continuous wave mode coincides with a transmission frequency of the frequency modulated continuous wave mode, to coincide with a timing at which the transmission frequency of the dual-frequency continuous wave mode is switched.

7. The radar system according to claim 2, wherein
    during a time period when a frequency output from the first radar in the frequency modulated continuous wave mode is higher than a predetermined frequency, the second radar outputs a frequency lower than the predetermined frequency, and
    during a time period when the frequency output from the first radar in the frequency modulated continuous wave mode is lower than the predetermined frequency, the second radar outputs a frequency higher than the predetermined frequency.

8. The radar system according to claim 2, wherein
    a frequency band of the frequency modulated continuous wave mode is wider than a frequency band of the continuous wave mode.

9. A method of controlling a radar system that detects a surrounding obstacle, comprising:
    transmitting a first radio wave in accordance with one or more frequency modulation patterns;
    transmitting a second radio wave in accordance with one or more frequency modulation patterns; and
    controlling the first radar and the second radar to transmit the first radio wave and second radio wave, respectively, by alternately switching between a first frequency modulation pattern and a second frequency modulation pattern that is different from the first frequency modulation pattern so that the first radio wave and the second radio wave do not continuously have a same frequency,
    wherein the first radar and the second radar are controlled so that, while one of the first radar and the second radar is transmitting in accordance with the first frequency modulation pattern, the other one of the first radar and the second radar transmits in accordance with the second frequency modulation pattern.

10. The method of controlling a radar system according to claim 9, wherein
    the first frequency modulation pattern is a continuous wave mode, the second frequency modulation pattern is a frequency modulated continuous wave mode, and the first frequency modulation pattern and the second frequency modulation pattern are controlled so that a transmission frequency of the continuous wave mode is not included in a transmission frequency band of the frequency modulated continuous wave mode.

11. The method of controlling a radar system according to claim 9, wherein the first frequency modulation pattern is a continuous wave mode, the second frequency modulation pattern is a frequency modulated continuous wave mode, and the first frequency modulation pattern and the second frequency modulation pattern are set so that a transmission frequency of the continuous wave mode coincides with an upper limit or a lower limit of a frequency band of the frequency modulated continuous wave mode.

* * * * *